US012407266B1

(12) United States Patent
Dutta et al.

(10) Patent No.: US 12,407,266 B1
(45) Date of Patent: Sep. 2, 2025

(54) ELECTRICAL SYSTEM AND RELATED METHODS

(71) Applicant: Aptiv Technologies AG, Schaffhausen (CH)

(72) Inventors: Sumit Dutta, Rochester Hills, MI (US); Wei Guo, Northville, MI (US); Pengyuan Chen, Troy, MI (US); Rachit Agarwal, Troy, MI (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/648,887

(22) Filed: Apr. 29, 2024

(51) Int. Cl.
*H02J 1/10* (2006.01)
*B60R 16/03* (2006.01)
*H02M 1/00* (2006.01)
*H02M 3/00* (2006.01)
*H02M 3/335* (2006.01)
*B60L 15/00* (2006.01)

(52) U.S. Cl.
CPC ......... *H02M 3/33576* (2013.01); *B60R 16/03* (2013.01); *H02M 1/0035* (2021.05); *H02M 3/01* (2021.05); *B60L 15/007* (2013.01); *B60L 2210/10* (2013.01)

(58) Field of Classification Search
CPC ................................................ H02M 3/33576
See application file for complete search history.

(56) References Cited

U.S. PATENT DOCUMENTS

2011/0205769 A1\* 8/2011 Blackwell ............... H02J 1/10
363/65
2022/0416676 A1 12/2022 Sivakumar
2023/0275509 A1 8/2023 Tang
2023/0318468 A1 10/2023 Meghnous
2024/0223069 A1\* 7/2024 Lin ....................... H02M 1/088

OTHER PUBLICATIONS

Fei et al., "Digital Implementation of Light-Load Efficiency Improvement for High-Frequency LLC Converters With Simplified Optimal Trajectory Control," in IEEE Journal of Emerging and Selected Topics in Power Electronics, vol. 6, No. 4, pp. 1850-1859, Dec. 2018, doi: 10.1109/JESTPE.2018.2832135.
Feng et al., "Optimal Trajectory Control of Burst Mode for LLC Resonant Converter," in IEEE Transactions on Power Electronics, vol. 28, No. 1, pp. 457-466, Jan. 2013, doi: 10.1109/TPEL.2012.2200110.

\* cited by examiner

*Primary Examiner* — Rexford N Barnie
*Assistant Examiner* — Esayas G Yeshaw
(74) *Attorney, Agent, or Firm* — Miller Johnson

(57) ABSTRACT

An electrical system includes a DC/DC converter having a first transistor and a second transistor and a controller. The converter is configured to supply an output voltage to a load. The controller is configured to operate the first and second transistors in a set of modes. When an electrical current drawn by the load is associated with a low electrical current, the set of modes is configured to reduce noise, vibration, and harshness by operating the first and second transistors in a continuous switching mode when the current drawn by the load exceeds a first threshold, operating the first and second transistors in a PWM mode when the current drawn by the load is less than the first threshold and greater than a second threshold, and operating the first and second transistors in a burst mode when the current drawn by the load is less than the second threshold.

20 Claims, 8 Drawing Sheets

ELECTRICAL SYSTEM AND RELATED METHODS

FIELD

The present disclosure relates to an electrical system and more particularly to an electrical system that includes a direct current to direct current converter that may be used in connection with vehicles.

BACKGROUND

Electric vehicles (EVs) are gaining popularity as environmentally friendly alternatives to traditional internal combustion engine vehicles. EVs are powered by rechargeable batteries, which require periodic charging to ensure continuous operation. Conventionally, EVs are equipped with on-board chargers that facilitate the charging of the vehicle's batteries by connecting to an external power source, such as a charging station or electrical outlet. Conventional on-board chargers typically include a direct current to direct current converter (DC/DC converter) that regulates and converts one voltage level of direct current to another voltage level to enable power distribution for electrical systems and components of a vehicle. Conventional DC/DC converters are not configured to maintain high efficiency and low noise, vibration, and harshness (NVH) during operation at light loads. While known DC/DC converters have proven acceptable for their intended purpose, a continuous need for improvement remains in the pertinent art.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides an electrical system. The electrical system includes a DC/DC converter and a controller. The DC/DC converter includes a first transistor and a second transistor. The DC/DC converter is configured to receive an input voltage and supply an output voltage to a load. The controller is electrically connected with the DC/DC converter. The controller is configured to operate the first transistor and the second transistor in a set of modes. When an electrical current drawn by the load is associated with a low electrical current, the set of modes is configured to reduce noise, vibration, and harshness (NVH) by operating the first transistor and the second transistor in a continuous switching mode of the set of modes when the electrical current drawn by the load exceeds a first threshold, operating the first transistor and the second transistor in a pulse width modulation (PWM) mode of the set of modes when the electrical current drawn by the load is less than the first threshold and greater than a second threshold, and operating the first transistor and the second transistor in a burst mode of the set of modes when the electrical current drawn by the load is less than the second threshold.

Another aspect of the disclosure provides a method of operating an electrical system. The electrical system includes a DC/DC converter having a first transistor and a second transistor and a controller electrically connected with the DC/DC converter and configured to operate the first transistor and the second transistor in a set of modes. The method includes supplying, via the DC/DC converter, an output voltage to a load. The method includes, when an electrical current drawn by the load is associated with a low electrical current, reducing noise, vibration, and harshness (NVH) by operating the first transistor and the second transistor in a continuous switching mode of the set of modes when the electrical current drawn by the load exceeds a first threshold, operating the first transistor and the second transistor in a pulse width modulation (PWM) mode of the set of modes when the electrical current drawn by the load is less than the first threshold and greater than a second threshold, and operating the first transistor and the second transistor in a burst mode of the set of modes when the electrical current drawn by the load is less than the second threshold.

Yet another aspect of the disclosure provides a DC/DC converter. The DC/DC converter includes a first transistor and a second transistor electrically connected with a controller. The first transistor and the second transistor are configured to operate in a set of modes. The DC/DC converter is configured to supply an output voltage to a load. When an electrical current drawn by the load is associated with a low electrical current, the set of modes is configured to reduce noise, vibration, and harshness (NVH) by operating the first transistor and the second transistor in a continuous switching mode of the set of modes when the electrical current drawn by the load exceeds a first threshold, operating the first transistor and the second transistor in a pulse width modulation (PWM) mode of the set of modes when the electrical current drawn by the load is less than the first threshold and greater than a second threshold, and operating the first transistor and the second transistor in a burst mode of the set of modes when the electrical current drawn by the load is less than the second threshold.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
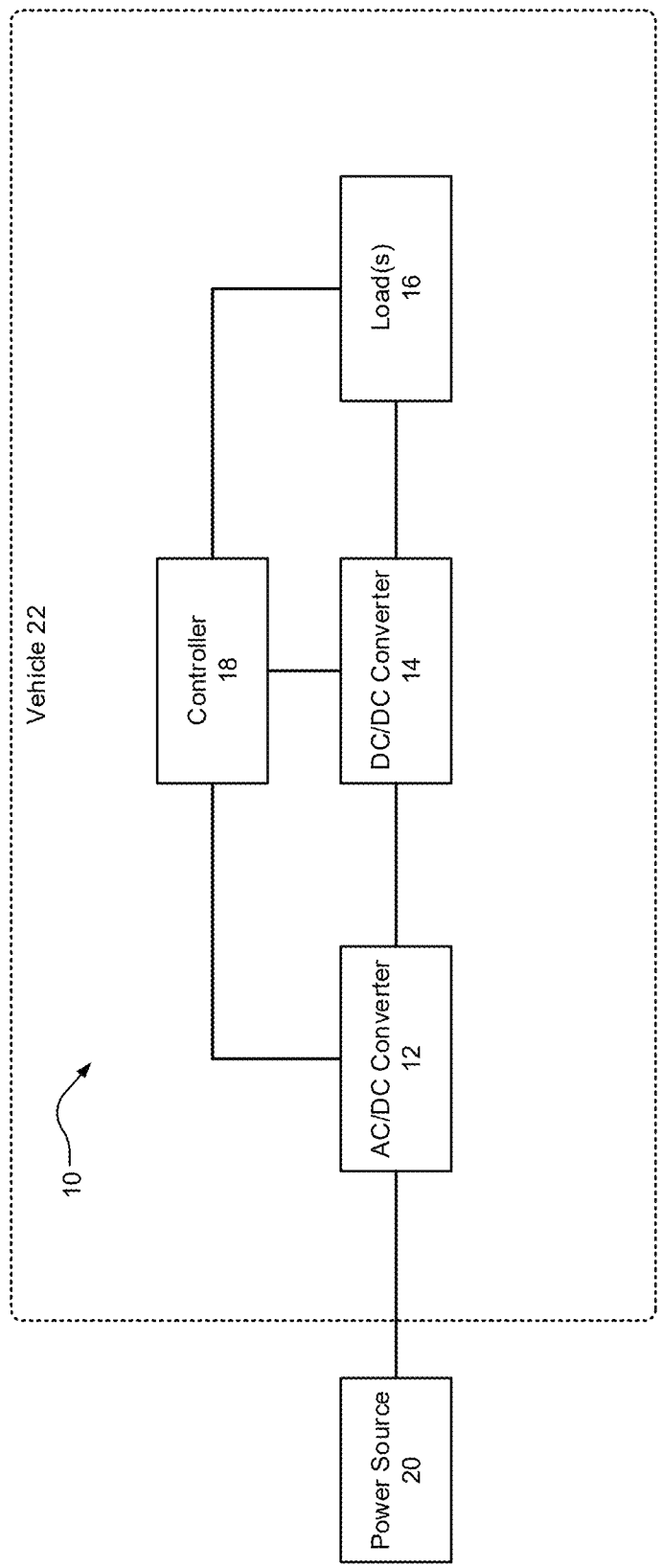
FIG. 1 is a high-level schematic view of an example electrical system in accordance with the principles of the present disclosure

With reference to FIG. 1, an example electrical system 10 is shown. As will be explained in more detail below, the electrical system 10 may include an alternating current to direct current converter (AC/DC converter) 12, a direct current to direct current converter (DC/DC converter) 14, at least one electrical load 16, and/or a controller 18, among others.

In various implementations, the AC/DC converter 12 may be electrically connected with the DC/DC converter 14, the load 16, and/or the controller 18. In various implementations, the AC/DC converter 12 may be detachable coupled with a power source 20. In various implementations, the DC/DC converter 14 may be electrically connected with the AC/DC converter 12, the load 16, and/or the controller 18. In various implementations, the controller 18 may be electrically connected with the AC/DC converter 12, the DC/DC converter 14, and/or the load 16. In various implementations, the electrical system 10 may be installed in and/or may be used in connection with a vehicle 22 (e.g., an automobile).

AC/DC Converter

In various implementations, the AC/DC converter 12 may receive alternating current from the power source 20. In some example configurations, the AC/DC converter 12 may operate as and/or may include a rectifier. For example, the AC/DC converter 12 may include a plurality of transistors. In various implementations, the AC/DC converter 12 may transform the alternating current received from the power source 20 to direct current and may transmit the direct current to the DC/DC converter 14.

DC/DC Converter

Figure 2:
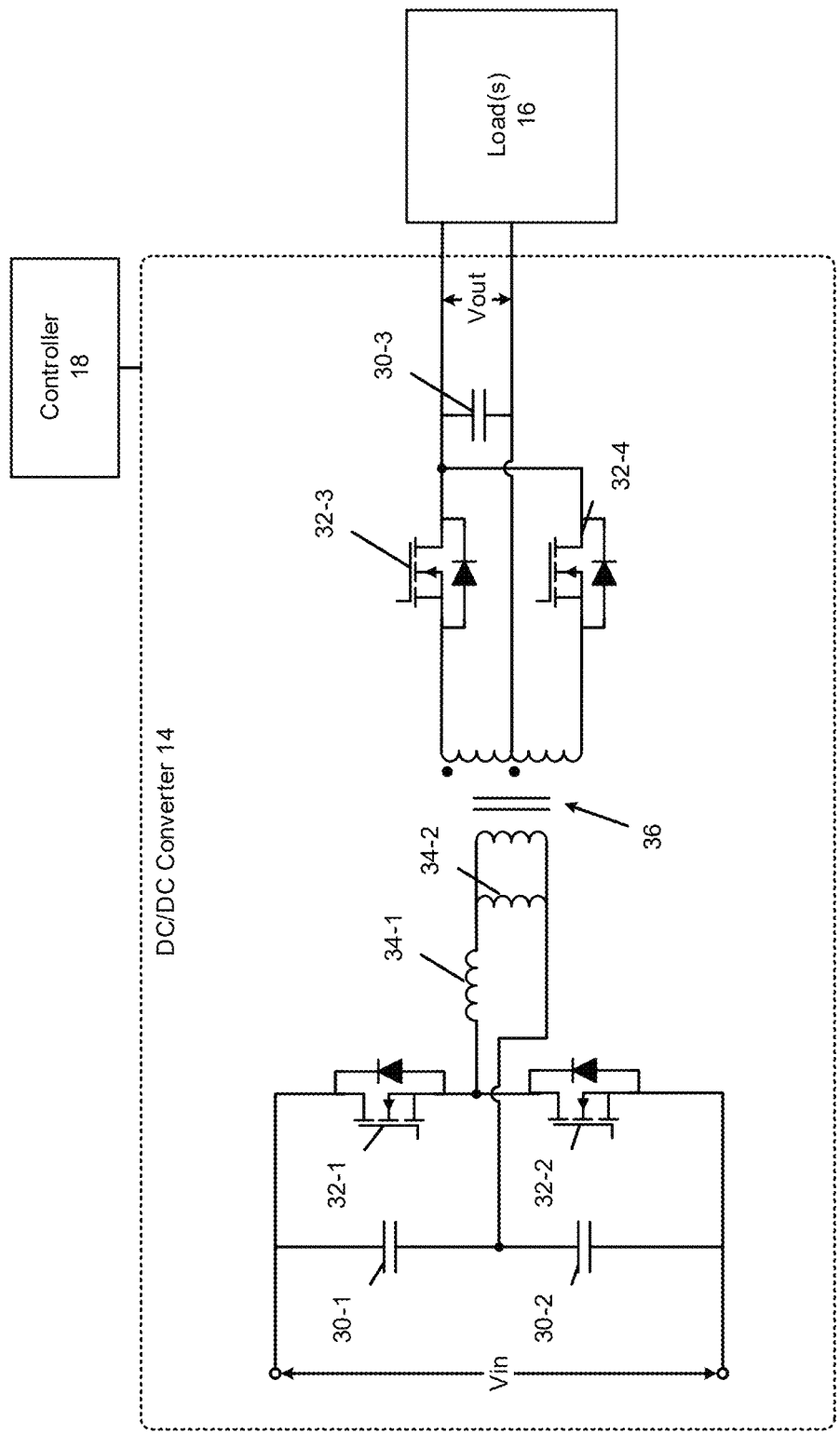
FIG. 2 is a schematic view of an example DC/DC converter of an electrical system in accordance with the principles of the present disclosure.

With reference to FIG. 2, an example DC/DC converter 14 is shown. In various implementations, the DC/DC converter 14 may be associated with a resonant DC/DC converter. In various implementations, the DC/DC converter 14 may receive an input voltage Vin from the AC/DC converter 12. The DC/DC converter 14 may step up or step down the input voltage Vin to produce an output voltage Vout and may supply the output voltage Vout to the load 16. In various implementations, the DC/DC converter 14 may supply electrical current to the load 16.

In some example configurations, the DC/DC converter 14 may include a first capacitor 30-1, a second capacitor 30-2, a third capacitor 30-3, a first transistor 32-1, a second transistor 32-2, a third transistor 32-3, a fourth transistor 32-4, a first inductor 34-1, a second inductor 34-2, and/or a transformer 36, among others. While the DC/DC converter 14 is shown including four transistors, three capacitors, and two inductors, the DC/DC converter 14 may include more than or less than four transistors, three capacitors, and two inductors.

In various implementations, the first transistor 32-1 may be associated with a high side transistor and the second transistor 32-2 may be associated with a low side transistor. In various implementations, the first capacitor 30-1, the second capacitor 30-2, the first inductor 34-1, and the second inductor 34-2 may operate as and/or may define a resonant circuit. The first transistor 32-1 and the second transistor 32-2 may be electrically connected with the resonant circuit. In various implementations, the third transistor 32-3 and the fourth transistor 32-4 may operate as and/or may define a rectifier. The transformer 36 may electrically connect the resonant circuit with the rectifier. The third capacitor 30-3 may be electrically connected with the rectifier and may filter the output voltage Vout.

In various implementations, each transistor (e.g., transistors 32-1 to 32-4, etc.) may include a field effect transistor (FET), a metal oxide semiconductor field effect transistor (MOSFET), such as n-channel or p-channel MOSFET, a bipolar junction transistor (BJT), a smart FET, and/or a silicon die (e.g., bare silicon die), among others. Each transistor may include a closed (e.g., activated) state that may permit electrical current to flow through the respective transistor. Each transistor may include an open (e.g., deactivated) state that may prevent electrical current from flowing through the respective transistor.

In various implementations, the controller 18 may control operation of the DC/DC converter 14 by selectively activating or deactivating each transistor (e.g., transistors 32-1 to 32-4, etc.). For example, the controller 18 may transmit control signals to each transistor to control the switching of the transistors, for example and without limitation, based on electrical current drawn from the load 16 and/or the operating frequency of the DC/DC converter 14.

In various implementations, the controller 18 may operate at least the first transistor 32-1 and the second transistor 32-2 in a set of modes. In various implementations, the controller 18 reduces noise, vibration, and harshness (NVH) when an electrical current drawn by the load 16 is associated with a low electrical current (e.g., less than 10 A) by operating the first transistor 34-1 and the second transistor 34-2 in the set of modes. In various implementations, the set of modes may include a continuous switching mode, a pulse width modulation (PWM) mode, and a burst mode, among others In various implementations, the continuous switching mode is associated with the first transistor 32-1 and the second transistor 32-1 continuously switching on and off at a determined frequency. In various implementations, the first transistor 32-1 and the second transistor 32-2 may operate in the continuous switching mode when the electrical current drawn by the load 16 exceeds a first threshold (e.g., 7.5 A or 100 W). In some instances, the continuous switching mode may include a duty cycle of 0.5.

In various implementations, the PWM mode may be associated with an additional continuous switching mode that includes a duty cycle that is different than the duty cycle of the continuous switching mode. In some instances, the PWM mode may include a duty cycle of less than 0.5. In various implementations, the first transistor 32-1 and the second transistor 32-2 may operate in the PWM mode when the electrical current drawn by the load 16 is less than the first threshold and greater than a second threshold (e.g., 1 A or 10 W). In various implementations, the PWM mode may reduce an operating efficiency of the DC/DC converter 14 while simultaneously reducing NVH.

In various implementations, the burst mode is associated with the first transistor 32-1 and the second transistor 32-2 being periodically switched on for short bursts of time. The burst mode allows the DC/DC converter 14 to operate at a low power level when the load 16 draws low electrical current while simultaneously permitting the DC/DC converter 14 to maintain responsiveness to sudden changes in the electrical current drawn by the load 16 via rapid activation. In various implementations, the first transistor 32-1 and the second transistor 32-2 may operate in the burst mode when the electrical current drawn by the load 16 is less than the second threshold. In various implementations, the burst mode may include a duty cycle that is identical to the duty cycle of the PWM mode (e.g., less than 0.5).

In various implementations, the set of modes are performed sequentially. In some examples, the continuous switching mode may be performed first. The PWM mode may be performed second. The burst mode may be performed third.

In various implementations, the controller 18 may determine the operating frequency of the DC/DC converter 14 and/or the current drawn by the load 16. In some instances, the controller 18 may determine the operating frequency of the DC/DC converter 14 based on the current drawn by the load 16. In various implementations, the controller 18 may determine what mode to operate the first transistor 32-1 and the second transistor 32-1 in based on the determined operating frequency. In some examples, if the determined operating frequency is similar to the resonant frequency of the DC/DC converter 14, the load 16 may be drawing medium to high current and the first transistor 32-1 and the second transistor 32-2 may operate in the continuous switching mode. If the determined operating frequency is greater than the resonant frequency of the DC/DC converter 14, the load 16 may be drawing low current and the first transistor 32-1 and the second transistor 32-2 may operate in the PWM mode or the burst mode.

Load

In various implementations, an electrical load 16 includes one or more of a variety of configurations. An electrical load 16 may include an electrical system, an electrical component, an electrical device, and/or onboard electronics, among others. In some example configurations, an electrical load 16 may include a battery. A battery may include one or more battery packs. A battery pack may include a plurality of battery cells. In various implementations, the battery may supply electricity to electric motors, electrical systems, electrical components, and/or onboard electronics of the vehicle 22. While the electrical system 10 is generally depicted as including one electrical load 16, the electrical system 10 may include more than one electrical load 16. In some instances, the electrical system 10 may include a plurality of electrical loads 16.

Controller

Figure 3:
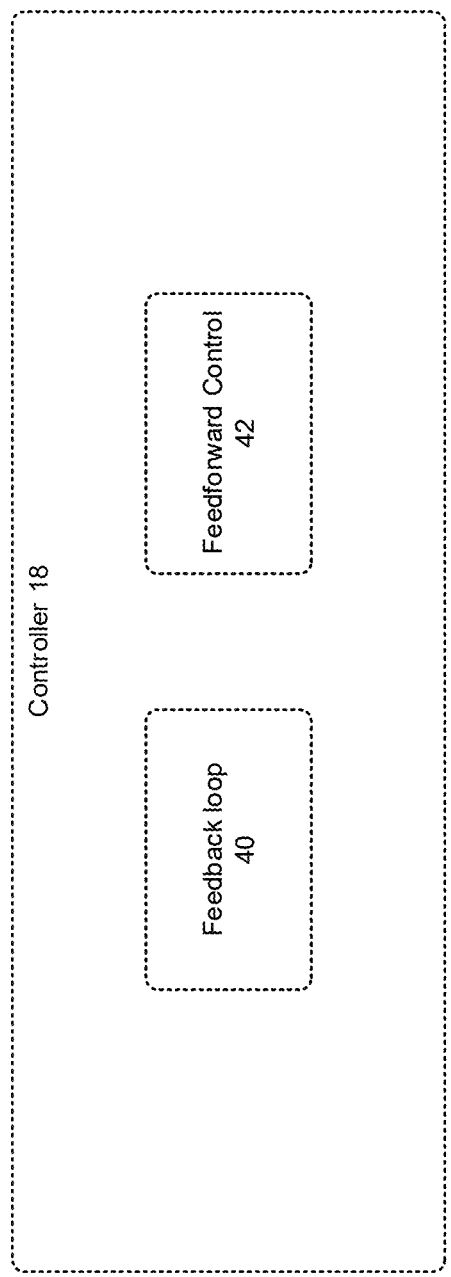
FIG. 3 is a schematic view of an example controller of an electrical system in accordance with the principles of the present disclosure.

With reference to FIG. 3, in some example configurations, the controller 18 may include a feedback loop 40 and/or a feedforward control 42, among others. In various implementations, the feedback loop 40 may monitor the output voltage Vout of the DC/DC converter 14 and/or an electrical current draw of the load 16, among others. In various implementations, the feedback loop 40 may compare the output voltage Vout with a reference voltage. In various implementations, the reference voltage may represent a desired output voltage level of the DC/DC converter 14.

In various implementations, the feedback loop 40 may be a closed loop system that regulates the output voltage Vout of the DC/DC converter 14. The feedback loop 40 may permit the DC/DC converter 14 to operator steadily under varying load (e.g., electrical currents drawn by the load 16) and/or input conditions (e.g., varying input voltage Vin).

In various implementations, the feedback loop 40 may include an error amplifier, a voltage divider network, a comparator, a PWM generator, control circuit, and/or a feedback path, among others. In various implementations, the error amplifier may compare the output voltage Vout with the reference voltage and may generate an output that represents a difference (e.g., an error) between the output voltage Vout and the reference voltage. In various implementations, the voltage divider network may provide a portion of the output voltage Vout to compare with the reference voltage. In various implementations, the voltage divider network may include a set of resistors that operate as and/or define a voltage divider to reduce the output voltage Vout.

In various implementations, the comparator may compare an output of the voltage divider network with the reference voltage. The comparator may generate an output signal that indicates whether the output voltage Vout is above or below the desired output voltage level. In various implementations, the PWM generator may generate PWM signals based on the output of the comparator. In some instances, widths of the pulses of the PWM signals may be proportional to the difference between the output voltage Vout and the reference voltage.

In various implementations, the control circuit may process the output of the error amplifier to generate control signals to control and/or adjust operation of the DC/DC converter 14. For example, the control circuit may adjust duty cycles for each transistor (e.g., transistors 32-1 to 32-4, etc.). In various implementations, the feedback path may transmit a feedback signal from an output of the DC/DC converter 14 to the error amplifier. In various implementations, the feedback path permits continuous monitoring and/or adjusting of the output voltage Vout.

Figure 4:
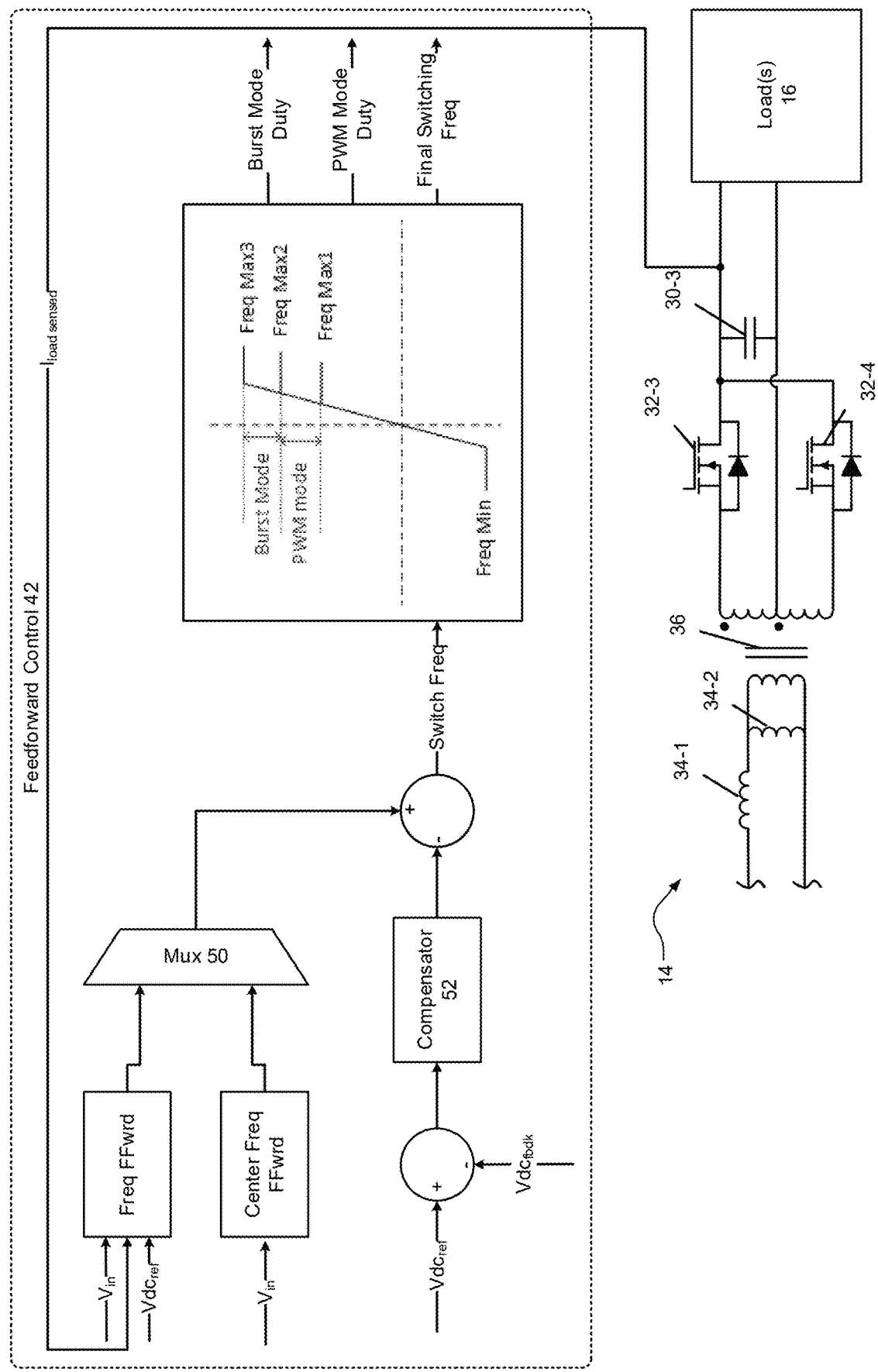
FIG. 4 is a schematic view of an example feedforward control of an electrical system in accordance with the principles of the present disclosure.

With reference to FIG. 4, an example feedforward control 42 is shown. In some example configurations, the feedforward control 42 may be electrically connected to the DC/DC converter 14 between the third capacitor 30-3 and the load 16. In various implementations, the feedforward control 42 may determine an operating frequency of the DC/DC converter 14, the first transistor 32-1, and/or the second transistor 32-2, among others.

In various implementations, the feedforward control 42 improves the dynamic performance of the DC/DC converter 14. For example, the feedforward control 42 may detect a current draw of the load 16. The feedforward control 42 may transmit control signals (e.g., command frequencies) to the first transistor 32-1 and the second transistor 32-2 based on the detected current draw. In various implementations, the control signals may cause the first transistor 32-1 and the second transistor 32-2 to operate in the burst mode when the detected current draw is less than a threshold (e.g., 1 A or 10 W).

In various implementations, the feedforward control 42 may include a multiplexer (MUX) 50 and a compensator 52, among others. In various implementations, the MUX 50 may receive a set of inputs. The set of inputs may include the input voltage Vin of the DC/DC converter 14, the detected current draw $I_{load\ sensed}$, and/or the reference voltage $Vdc_{ref}$, among others. The MUX 50 may transmit an output to the compensator 52. The compensator 52 may adjust control signals for the first transistor 32-1 and the second transistor 32-2 based on an additional set of inputs. The additional set of inputs may include the reference voltage $Vdc_{ref}$, feedback voltage $Vdc_{fdbk}$, and/or the output from the MUX 50, among others. The compensator 52 may determine a switching frequency for the first transistor 32-1 and the second transistor 32-2 based on the additional set of inputs. In some example configurations, the compensator 52 may include an error amplifier, a feedback network, and/or a compensation network, among others.

Figure 5:
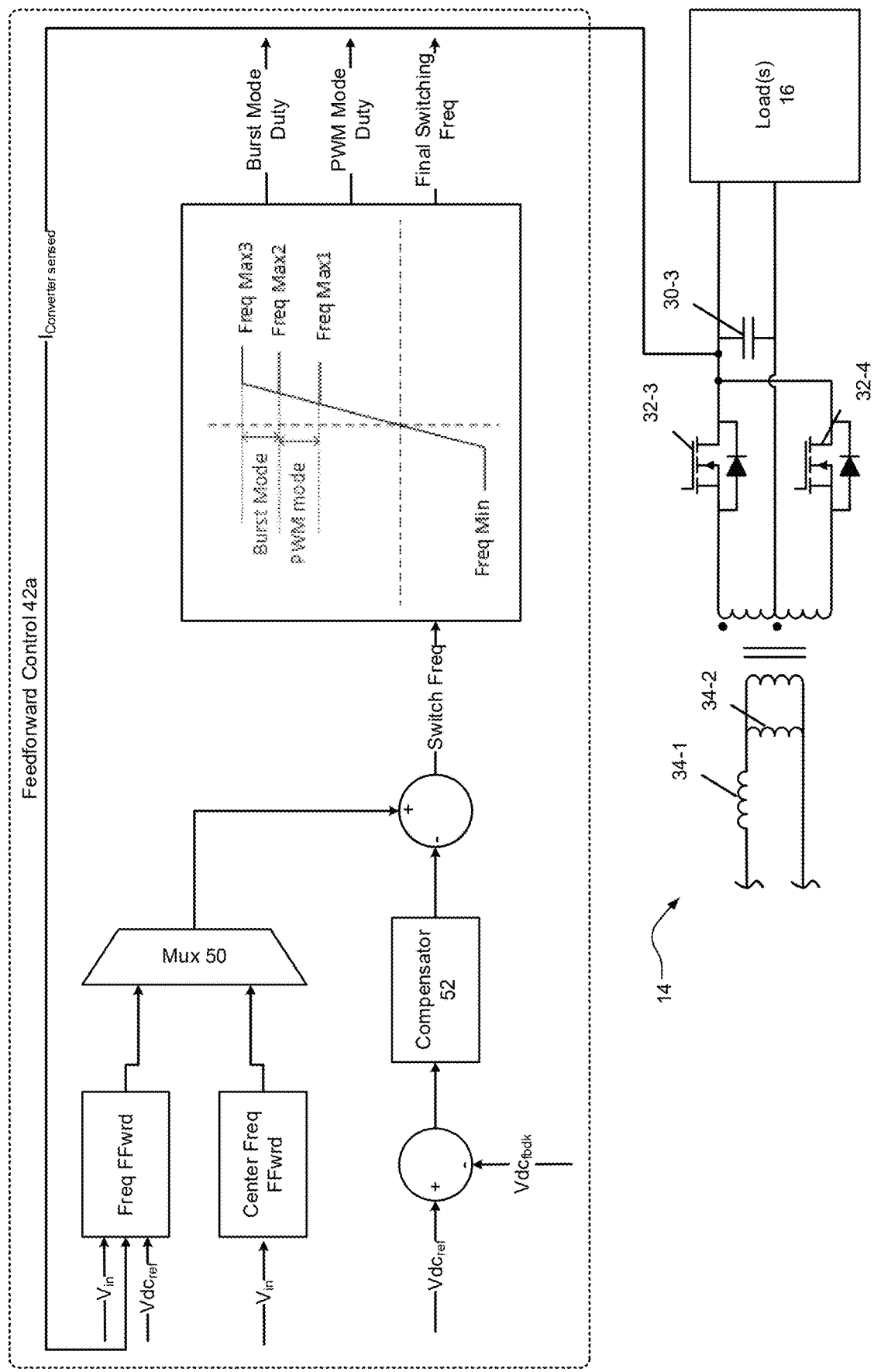
FIG. 5 is a schematic view of an example feedforward control of an electrical system in accordance with the principles of the present disclosure.

With reference to FIG. 5, a feedforward control 42a is provided. In view of the substantial similarity in structure and function of the components associated with the feedforward control 42a relative to the feedforward control 42, like reference numerals are used hereinafter and in the drawings to identify like components, and references to the feedforward control 42 will be understood to apply equally to the feedforward control 42a unless otherwise indicated.

In some example configurations, the feedforward control 42a may be electrically connected to the DC/DC converter 14 between the third capacitor 30-3 and the third and fourth transistors 32-3, 32-4. In various implementations, the feedforward control 42a may detect an electrical current $I_{converter\ sensed}$ outputted from the DC/DC converter and may transmit the detected electrical current to the MUX 50. The MUX 50 may use the detected electrical current as an input.

In various implementations, the controller 18 includes an electronic controller and/or an electronic processor, such as a programmable microprocessor and/or microcontroller. The controller 18 may include an application specific integrated circuit (ASIC). The controller 18 may include a central processing unit (CPU), a memory (for example, a non-transitory computer-readable storage medium), and/or an input/output (I/O) interface. The controller 18 may perform various functions, including those described in greater detail herein, with appropriate programming instructions and/or code embodied in software, hardware, and/or other medium. The controller 18 may include a plurality of controllers. The controller 18 may be connected to a display, such as a touch screen.

Power Source

In various implementations, the power source 20 may be associated with the power grid, a solar panel, a power converter, and/or an outlet, among others. In various implementations, residential, commercial, and/or public charging infrastructure may be used to connect the vehicle 22 with the power source 20. In some examples, the charging infrastructure may include a charging station, a charging cable, and/or a charging connector, among others.

Vehicle

With reference to FIG. 1, the electrical system 10 may be incorporated with and/or disposed in the vehicle 22. The vehicle 22 may include one or more of a variety of configurations. For example, a vehicle 22 may include a land vehicle, a passenger car, a van, a sport utility vehicle (SUV), a crossover, a truck (e.g., a pickup truck, a commercial truck, etc.), a bus, a watercraft, an aircraft (e.g., a plane, a helicopter, etc.), and/or a combination thereof (e.g., a vehicle for land and water, a vehicle for air and water, etc.), among others.

Operation of DC/DC Converter

Figure 6A:
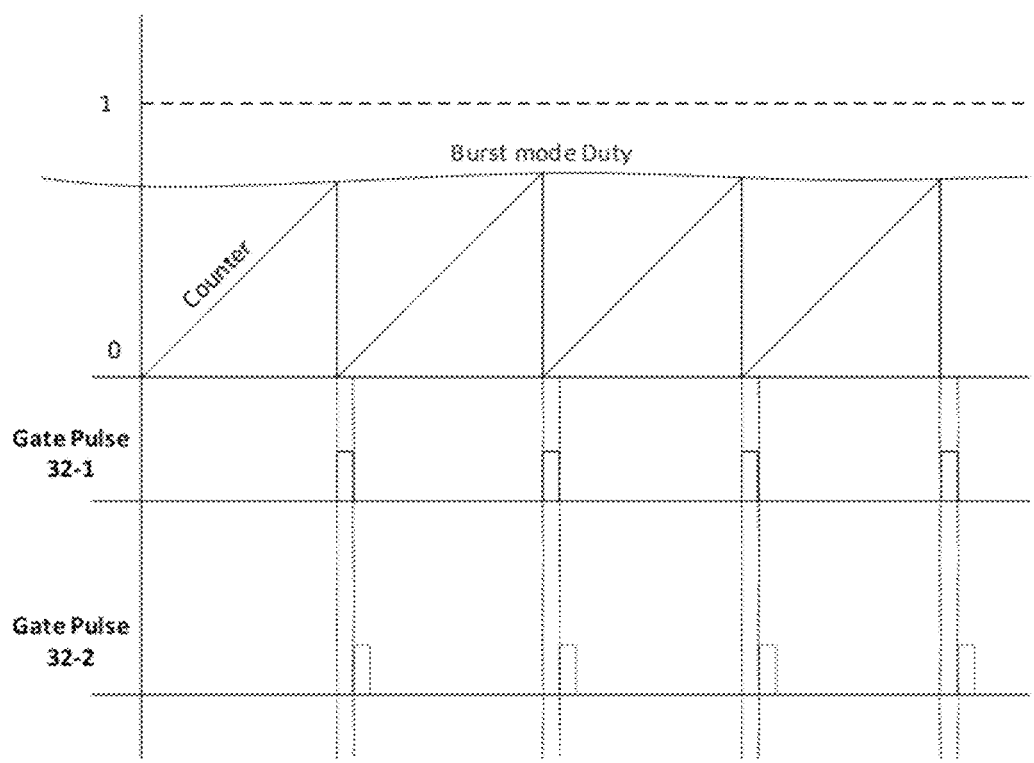
FIGS. 6A and 6B are graphical illustrations depicting example control signals for a DC/DC converter in accordance with the principles of the present disclosure.
Figure 6B:
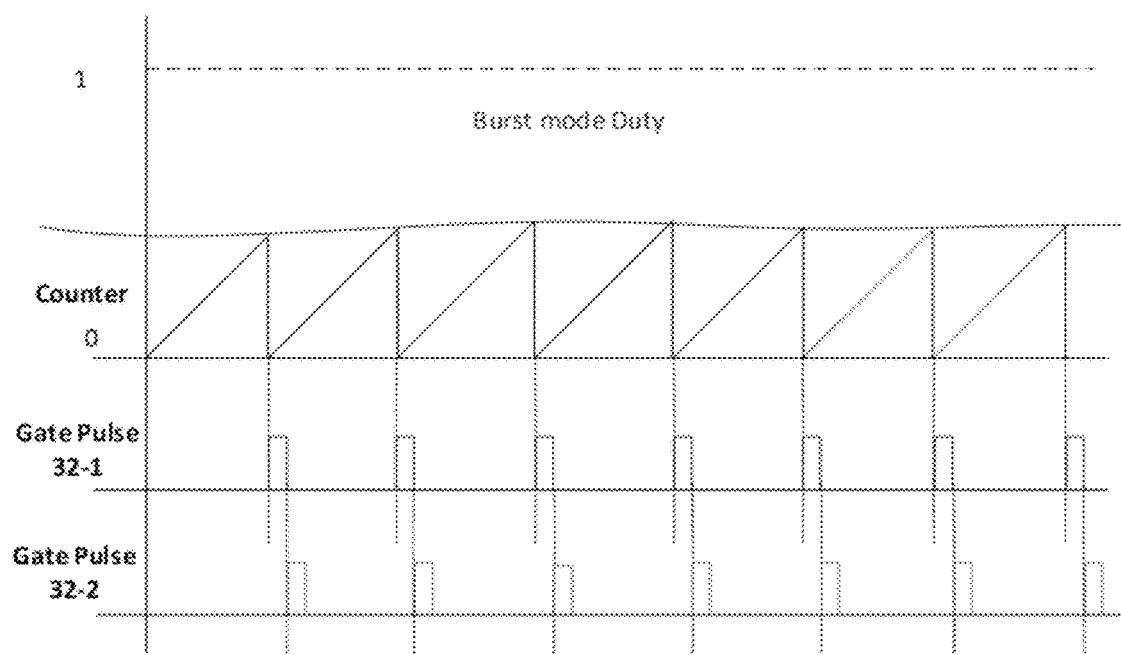

FIGS. 6A, 6B, 7A, 7B, and 7C are example control signals for operating the first transistor 32-1 and the second transistor 32-2 in the set of modes. With reference to FIGS. 6A and 6B, example control signals are shown for operating the first transistor 32-1 and the second transistor 32-2 in the burst mode. Example duty cycles, frequencies, and pulses and sequences for switching the first transistor 32-1 and the second transistor 32-2 on and off are shown. In various implementations, when electrical current drawn from the load 16 increases, while the first transistor 32-1 and the second transistor 32-2 are operating in the burst mode, the duty cycle may decrease such that the pulse density is increased and power transferred to the load 16 is increased.

Figure 7A:
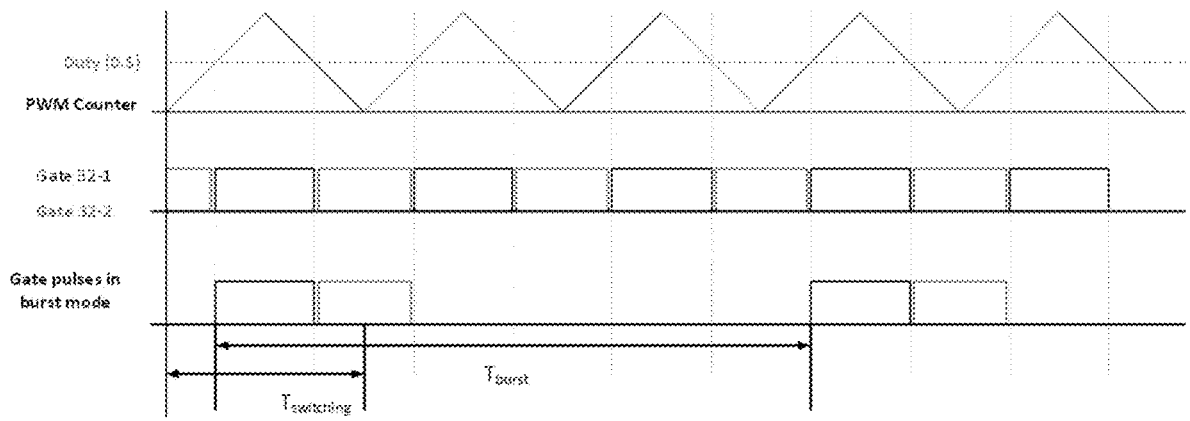
FIGS. 7A, 7B, and 7C are graphical illustrations depicting example control signals for a DC/DC converter in accordance with the principles of the present disclosure.
Figure 7B:
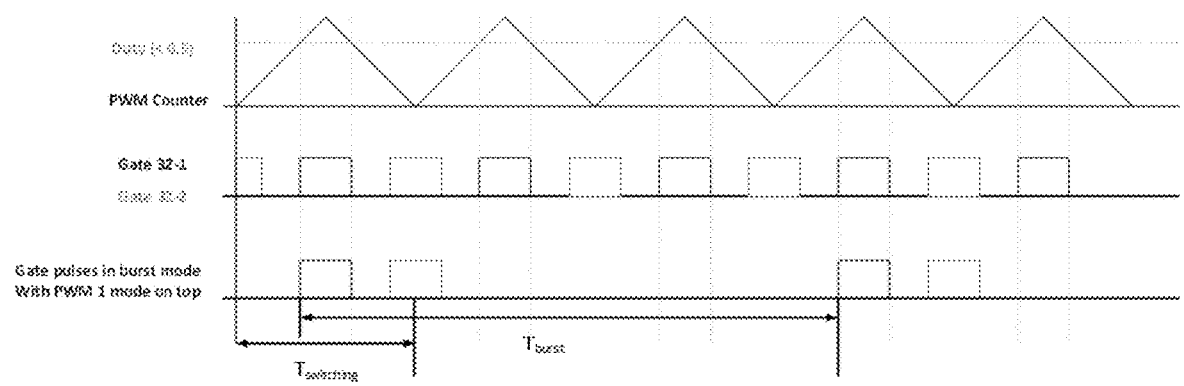
Figure 7C:
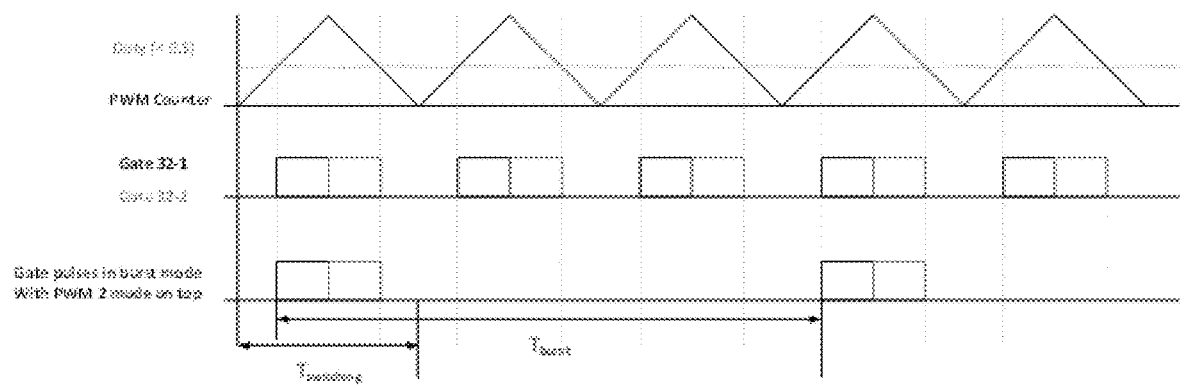

With reference to FIGS. 7A, 7B, and 7C, example control signals for operating the first transistor 32-1 and the second transistor 32-2 in the set of modes is shown. In various implementations, the first transistor 32-1 and the second transistor 32-2 may operate in the continuous switching mode or the PWM mode to regulate the output voltage Vout of the DC/DC converter 14 until electrical current drawn by the load 16 decreases to a determine level, then the first transistor 32-1 and the second transistor 32-2 may operate in the burst mode. In the burst mode, the first transistor 32-1 and the second transistor 32-2 may have a reduced switching frequency or may have intermittent switching cycles to minimize power consumption while simultaneously maintaining the ability to quickly response to increased current draw of the load 16 to optimize efficiency of the electrical system 10.

Referring now to FIG. 7A, a continuous switching mode with a burst mode implemented on top of the continuous switching mode is shown. The modes include a duty cycle of 0.5. Example frequencies and pulses and sequences for switching the first transistor 32-1 and the second transistor 32-2 on and off are shown. The switching frequency (e.g., at least 100 kHz) and the burst frequency (e.g., at least 1 kHz) of the first transistor 32-1 and the second transistor 32-2 are shown. In various implementations, the switching frequency may equal 1/Tswitching and the burst frequency may equal 1/Tburst.

Referring now to FIG. 7B, a continuous switching mode with a burst mode implemented on top of the continuous switching mode is shown. The modes include a duty cycle of less than 0.5. Example frequencies and pulses and sequences for switching the first transistor 32-1 and the second transistor 32-2 on and off are shown. The switching frequency (e.g., at least 100 kHz) and the burst frequency (e.g., at least 1 kHz) of the first transistor 32-1 and the second transistor 32-2 are shown. In various implementations, the switching frequency may equal 1/Tswitching and the burst frequency may equal 1/Tburst.

Referring now to FIG. 7C, a continuous switching mode with a burst mode implemented on top of the continuous switching mode is shown. The modes include a duty cycle of less than 0.5. Example frequencies and pulses and sequences for switching the first transistor 32-1 and the second transistor 32-2 on and off are shown. The switching frequency (e.g., at least 100 kHz) and the burst frequency (e.g., at least 1 kHz) of the first transistor 32-1 and the second transistor 32-2 are shown. In various implementations, the switching frequency may equal 1/Tswitching and the burst frequency may equal 1/Tburst.

Flowchart

Figure 8:
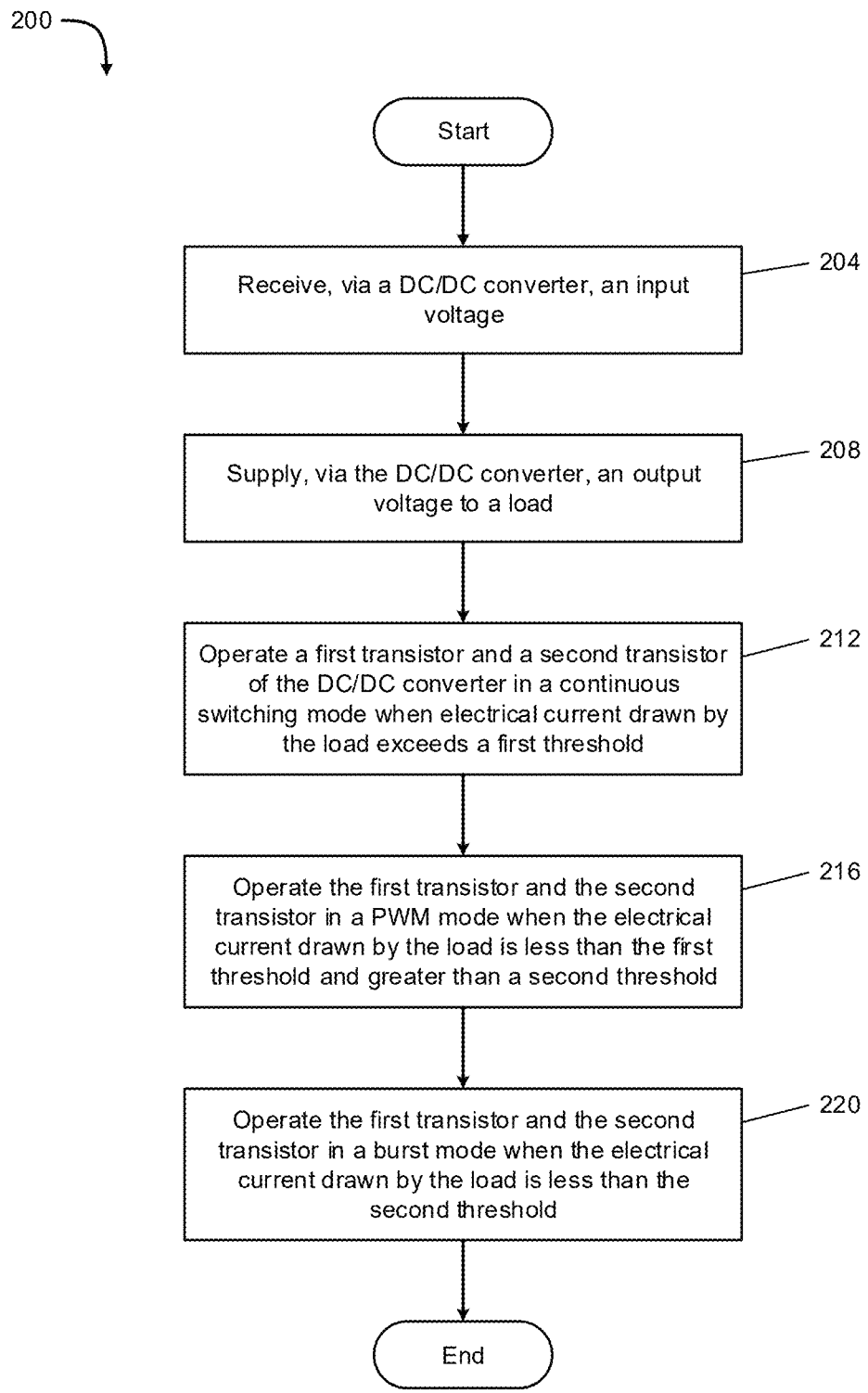
FIG. 8 is a flowchart depicting an example method for operating an electrical system in accordance with the principles of the present disclosure.

FIG. 8 is an example method 200 for operating an electrical system 10. In various implementations, the electrical system 10 may include a DC/DC converter 14 having a first transistor 32-1 and a second transistor 32-2 and a controller 18 electrically connected with the DC/DC converter 14. The controller 18 is configured to operate the first transistor 32-1 and the second transistor 32-2 in a set of modes.

In various implementations, the method 200 may begin at 204. At 204, the DC/DC converter 14 may receive an input voltage Vin (e.g., from an AC/DC converter 12). The method 200 may proceed to 208. At 208, the DC/DC converter 14 may supply an output voltage Vout to a load 16. The method 200 may proceed to 212. In various implementations, operating the first transistor 32-1 and the second transistor 32-2 in the set of modes reduces noise, vibration, and harshness (NVH) when an electrical current drawn by the load 16 is associated with a low electrical current. At 212, the first transistor 32-1 and the second transistor 32-2 may operate in a continuous switching mode when electrical current drawn by the load 16 exceeds a first threshold (e.g., 7.5 A or 100 W). The method 200 may proceed to 216.

At 216, the first transistor 32-1 and the second transistor 32-2 may operate in a PWM mode when the electrical current drawn by the load 16 is less than the first threshold and greater than a second threshold (e.g., 1 A or 10 W). The method 200 may proceed to 220. At 220, the first transistor 32-1 and the second transistor 32-2 may operate in a burst mode when the electrical current drawn by the load 16 is less than the second threshold. Then the method 200 may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The following Clauses provide an exemplary configuration for an electrical system and related methods, as described above.

Clause 1: An electrical system comprising: a DC/DC converter including a first transistor and a second transistor, the DC/DC converter configured to receive an input voltage and supply an output voltage to a load; and a controller electrically connected with the DC/DC converter, the controller configured to operate the first transistor and the second transistor in a set of modes, wherein, when an electrical current drawn by the load is associated with a low electrical current, the set of modes is configured to reduce noise, vibration, and harshness (NVH) by: operating the first transistor and the second transistor in a continuous switching mode of the set of modes when the electrical current drawn by the load exceeds a first threshold, operating the first transistor and the second transistor in a pulse width modulation (PWM) mode of the set of modes when the electrical current drawn by the load is less than the first threshold and greater than a second threshold, and operating the first transistor and the second transistor in a burst mode of the set of modes when the electrical current drawn by the load is less than the second threshold.

Clause 2: The electrical system of clause 1, wherein the continuous switching mode includes a duty cycle of 0.5.

Clause 3: The electrical system of clause 1 or 2, wherein the PWM mode is associated with an additional continuous switching mode having a duty cycle of less than 0.5.

Clause 4: The electrical system of any of clauses 1 through 3, wherein the burst mode includes a duty cycle that is identical to a duty cycle of the PWM mode.

Clause 5: The electrical system of any of clauses 1 through 4, wherein the set of modes are performed sequentially.

Clause 6: The electrical system of clause 5, wherein: the PWM mode is performed after the continuous switching mode; and the burst mode is performed after the PWM mode.

Clause 7: The electrical system of any of clauses 1 through 6, wherein the PWM mode changes an operating efficiency of the DC/DC converter while simultaneously reducing NVH.

Clause 8: The electrical system of any of clauses 1 through 7, wherein the controller is configured to (i) detect a current draw of the load and (ii) transmit a command frequency to the first transistor and the second transistor based on the detected current draw.

Clause 9: The electrical system of clause 8, wherein the command frequency causes the first transistor and the second transistor to operate in the burst mode when the detected current draw is less than a third threshold.

Clause 10: A vehicle comprising: the electrical system of any of clauses 1 through 9.

Clause 11: A method of operating an electrical system including a DC/DC converter having a first transistor and a second transistor and a controller electrically connected with the DC/DC converter and configured to operate the first transistor and the second transistor in a set of modes, the method comprising: supplying, via the DC/DC converter, an output voltage to a load; and when an electrical current drawn by the load is associated with a low electrical current, reducing noise, vibration, and harshness (NVH) by: operating the first transistor and the second transistor in a continuous switching mode of the set of modes when the electrical current drawn by the load exceeds a first threshold, operating the first transistor and the second transistor in a pulse width modulation (PWM) mode of the set of modes when the electrical current drawn by the load is less than the first threshold and greater than a second threshold, and operating the first transistor and the second transistor in a burst mode of the set of modes when the electrical current drawn by the load is less than the second threshold.

Clause 12: The method of clause 11, wherein the continuous switching mode includes a duty cycle of 0.5.

Clause 13: The method of clause 11 or 12, wherein the PWM mode is associated with an additional continuous switching mode having a duty cycle of less than 0.5.

Clause 14: The method of any of clauses 11 through 13, wherein the burst mode includes a duty cycle that is identical to a duty cycle of the PWM mode.

Clause 15: The method of any of clauses 11 through 14, wherein reducing, via the controller, NVH includes performing the set of modes sequentially.

Clause 16: The method of clause 15, wherein performing the set of modes sequentially includes: performing the PWM mode after the continuous switching mode; and performing the burst mode after the PWM mode.

Clause 17: The method of any of clauses 11 through 16, wherein operating the first transistor and the second transistor in the PWM mode includes changing an operating efficiency of the DC/DC converter while simultaneously reducing NVH.

Clause 18: The method of any of clauses 11 through 17, further comprising: detecting, via the controller, a current draw of the load; transmitting, via the controller, a command frequency to the first transistor and the second transistor based on the detected current draw; and causing, via the command frequency, the first transistor and the second transistor to operate in the burst mode when the detected current draw is less than a third threshold.

Clause 19: A DC/DC converter comprising: a first transistor and a second transistor electrically connected with a controller, the first transistor and the second transistor configured to operate in a set of modes, and the DC/DC converter configured to supply an output voltage to a load, wherein, when an electrical current drawn by the load is associated with a low electrical current, the set of modes is configured to reduce noise, vibration, and harshness (NVH) by: operating the first transistor and the second transistor in a continuous switching mode of the set of modes when the electrical current drawn by the load exceeds a first threshold, operating the first transistor and the second transistor in a pulse width modulation (PWM) mode of the set of modes when the electrical current drawn by the load is less than the first threshold and greater than a second threshold, and operating the first transistor and the second transistor in a burst mode of the set of modes when the electrical current drawn by the load is less than the second threshold.

Clause 20: The DC/DC converter of clause 19, wherein the set of modes are performed sequentially.

The invention claimed is:

1. An electrical system comprising:
   a DC/DC converter including a first transistor and a second transistor, the DC/DC converter configured to receive an input voltage and supply an output voltage to a load; and
   a controller electrically connected with the DC/DC converter, the controller configured to operate the first transistor and the second transistor in a set of modes,
   wherein, when an electrical current drawn by the load is associated with a low electrical current, the set of modes is configured to reduce noise, vibration, and harshness (NVH) by:
      operating the first transistor and the second transistor in a continuous switching mode of the set of modes when the electrical current drawn by the load exceeds a first threshold,
      operating the first transistor and the second transistor in a pulse width modulation (PWM) mode of the set of modes when the electrical current drawn by the load is less than the first threshold and greater than a second threshold, and
   operating the first transistor and the second transistor in a burst mode of the set of modes when the electrical current drawn by the load is less than the second threshold.

2. The electrical system of claim 1 wherein the continuous switching mode includes a duty cycle of 0.5.

3. The electrical system of claim 1 wherein the PWM mode is associated with an additional continuous switching mode having a duty cycle of less than 0.5.

4. The electrical system of claim 1 wherein the burst mode includes a duty cycle that is identical to a duty cycle of the PWM mode.

5. The electrical system of claim 1 wherein the set of modes are performed sequentially.

6. The electrical system of claim 5 wherein:
   the PWM mode is performed after the continuous switching mode; and
   the burst mode is performed after the PWM mode.

7. The electrical system of claim 1 wherein the PWM mode changes an operating efficiency of the DC/DC converter while simultaneously reducing NVH.

8. The electrical system of claim 1 wherein the controller is configured to (i) detect a current draw of the load and (ii) transmit a command frequency to the first transistor and the second transistor based on the detected current draw.

9. The electrical system of claim 8 wherein the command frequency causes the first transistor and the second transistor to operate in the burst mode when the detected current draw is less than a third threshold.

10. A vehicle comprising:
the electrical system of claim 1.

11. A method of operating an electrical system including a DC/DC converter having a first transistor and a second transistor and a controller electrically connected with the DC/DC converter and configured to operate the first transistor and the second transistor in a set of modes, the method comprising:
supplying, via the DC/DC converter, an output voltage to a load; and
when an electrical current drawn by the load is associated with a low electrical current, reducing noise, vibration, and harshness (NVH) by:
operating the first transistor and the second transistor in a continuous switching mode of the set of modes when the electrical current drawn by the load exceeds a first threshold,
operating the first transistor and the second transistor in a pulse width modulation (PWM) mode of the set of modes when the electrical current drawn by the load is less than the first threshold and greater than a second threshold, and
operating the first transistor and the second transistor in a burst mode of the set of modes when the electrical current drawn by the load is less than the second threshold.

12. The method of claim 11 wherein the continuous switching mode includes a duty cycle of 0.5.

13. The method of claim 11 wherein the PWM mode is associated with an additional continuous switching mode having a duty cycle of less than 0.5.

14. The method of claim 11 wherein the burst mode includes a duty cycle that is identical to a duty cycle of the PWM mode.

15. The method of claim 11 wherein reducing, via the controller, NVH includes performing the set of modes sequentially.

16. The method of claim 15 wherein performing the set of modes sequentially includes:
performing the PWM mode after the continuous switching mode; and
performing the burst mode after the PWM mode.

17. The method of claim 11 wherein operating the first transistor and the second transistor in the PWM mode includes changing an operating efficiency of the DC/DC converter while simultaneously reducing NVH.

18. The method of claim 11 further comprising:
detecting, via the controller, a current draw of the load;
transmitting, via the controller, a command frequency to the first transistor and the second transistor based on the detected current draw; and
causing, via the command frequency, the first transistor and the second transistor to operate in the burst mode when the detected current draw is less than a third threshold.

19. A DC/DC converter comprising:
a first transistor and a second transistor electrically connected with a controller, the first transistor and the second transistor configured to operate in a set of modes, and the DC/DC converter configured to supply an output voltage to a load,
wherein, when an electrical current drawn by the load is associated with a low electrical current, the set of modes is configured to reduce noise, vibration, and harshness (NVH) by:
operating the first transistor and the second transistor in a continuous switching mode of the set of modes when the electrical current drawn by the load exceeds a first threshold,
operating the first transistor and the second transistor in a pulse width modulation (PWM) mode of the set of modes when the electrical current drawn by the load is less than the first threshold and greater than a second threshold, and
operating the first transistor and the second transistor in a burst mode of the set of modes when the electrical current drawn by the load is less than the second threshold.

20. The DC/DC converter of claim 19 wherein the set of modes are performed sequentially.

* * * * *